United States Patent

[11] 3,624,649

| [72] | Inventor | Michael A. Ranieri<br>Bensenville, Ill. |
|---|---|---|
| [21] | Appl. No. | 865,419 |
| [22] | Filed | Oct. 10, 1969 |
| [45] | Patented | Nov. 30, 1971 |
| [73] | Assignee | Honeywell, Inc.<br>Minneapolis, Minn. |

[54] PERIOD READOUT ERROR CHECKING APPARATUS
4 Claims, 5 Drawing Figs.

[52] U.S. Cl. .................................................... 340/409,
235/92 EV, 307/222, 340/206
[51] Int. Cl. ...................................................... G08b 29/00
[50] Field of Search .......................................... 340/409,
203, 206; 235/92 MT, 92 T, 92 F, 92 CA, 92 EV;
328/44, 141, 109; 307/222, 234; 324/79 D, 69

[56] References Cited
UNITED STATES PATENTS
| 3,183,436 | 5/1965 | Schmidt et al. ............... | 324/69 |
| 3,534,403 | 10/1970 | Matarese ..................... | 235/153 |

*Primary Examiner*—John W. Caldwell
*Assistant Examiner*—Robert J. Mooney
*Attorneys*—Lamont B. Koontz, Francis A. Sirr and Clyde C. Blinn ABSTRACT: A system for supervising the reliability of a pulsating output device in which the period between adjacent pulses is indicative of a measured condition wherein a counter is energized in a first direction by a separate signal source having a fixed frequency during a first of said periods and the counter is energized in the opposite direction during a second of said periods whereby the difference indicated by the counter between the starting count and the finish count is indicative of the difference between the first and second periods.

PATENTED NOV 30 1971 3,624,649

COUNTER OPERATION

INVENTOR:
MICHAEL A. RANIERI
BY
ATTORNEY.

PERIOD READOUT ERROR CHECKING APPARATUS

BACKGROUND AND SUMMARY OF THE INVENTION

In period readout devices wherein a series of signal pulses are provided with the period or length of time between the pulses being indicative of a sensed condition, the accuracy of such output devices has been determined by first measuring the period between a first set of pulses, then measuring the period between a second set of pulses and comparing the two measurements.

The present invention is concerned with a specific apparatus for comparing the length of the periods between two sets of adjacent pulses of a pulsating output device for error checking. Specifically, a counting apparatus is employed which is energized from a separate source of constant frequency pulses whereby the counting apparatus is energized in one direction from a start count during the first period of time between a first set of pulses and the counting apparatus is energized in an opposite direction to a finish count during the second period of time between a second set of pulses, and the difference between the start and finish count of the counting apparatus is used to determine any error.

The invention is disclosed in a drawing wherein.

DESCRIPTION OF THE INVENTION

Figure 1:
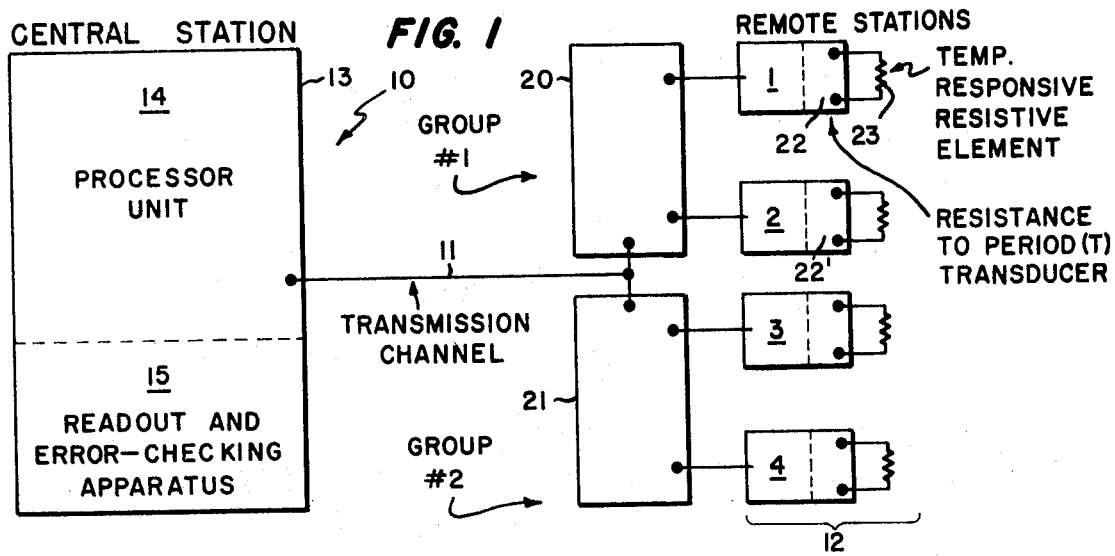
FIG. 1 is a schematic representation of a system showing a central station and a plurality of groups of remote stations each of which has a pulsating output transducer.

Referring to FIG. 1, a schematic showing of a system having a central station 10 connected by a transmission channel 11 to a plurality of groups (such as groups No. 1 and No. 2) of remote stations 12. The central station has a console 13 containing a processor unit 14 and a readout and error checking apparatus 15. The type of transmission used between console 13 and the remote group panels 20 and 21 is no part of the present invention. One particular type of transmission as disclosed in a James R. Berrett et al. U.S. Pat. application, Ser. No. 864,679 is accomplished by sending coded messages in a binary code form to accomplish certain supervision and control functions. Each of the remote stations 12 contain a resistance to period transducer 22 which when connected to a condition sensor device or temperature-responsive resistance element 23 provides a pulsating output in which the period or time interval between adjacent pulses is proportional to the level of a condition or temperature being sensed by element 23.

Figure 2:
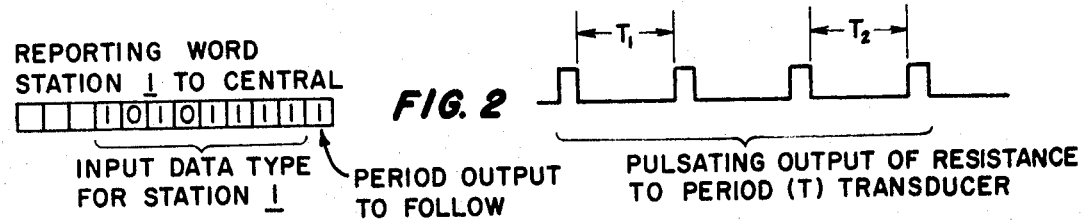
FIG. 2 is a reporting word for one of the remote stations which contains a pulsating output.
Figure 3:
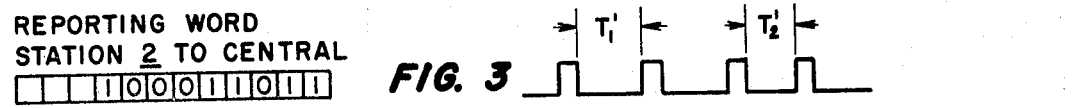
FIG. 3 is another reporting word for a second remote station containing a pulsating output.

When the remote stations 12 report to the central station 10, each remote station has a reporting word which is made up of a plurality of bits in binary form. The reporting word is followed by a series of at least four pulses and the period is measured between adjacent pulses to determine the level of the condition or the temperature to which element 23 is exposed. Specifically, the reporting word has a last bit which informs the central station that a pulsating or period output is to follow the reporting word. For example, referring to FIG. 2 a reporting word for group No. 1, station No. 1 is shown as made up of 12 bits. Eight of the bits are concerned with the identification of input data type for station No. 1 and the 12th bit is used to inform processor unit 14 at the central station that a series of pulses from the period output of the transducer will follow as shown to right of FIG. 2. Referring to FIG. 3, a similar reporting word is shown for group No. 1, station 2 having an input data type identification with the period output following the reporting word.

In order to maintain reliability and check for errors in such a system as shown in FIG. 1, apparatus for comparing two period outputs of a transducer is provided in the central station to determine whether two subsequent periods from one transducer are the same to detect if an error in either the transducer or the transmission exists.

Figure 4:
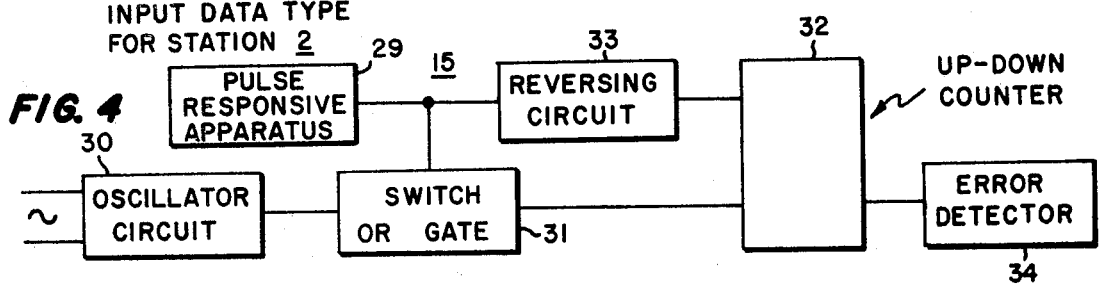
FIG. 4 is a schematic representation of the counting mechanism for detecting the error between adjacent periods.

Contained in central console 13 is an error-checking apparatus as shown in FIG. 4. A conventional oscillator circuit 30 provides an output which is connected through a switch or gate 31 to a conventional timer mechanism or up down counter 32. Counter 32 has a reversing circuit 33 for reversing the counter. Both switch 31 and reversing circuit 33 are controlled by pulse-responsive apparatus 29. Oscillator 30 has a constant frequency signal output which can be switched into counter 32 by switch 31 at the beginning of a period when apparatus 29 receives a pulse from transducer 22 and when a second pulse is received, switch 31 is opened to terminate the count by counter 32 at the end of the period. Upon apparatus 29 receiving a third pulse from transducer 22, reversing circuit 33 is energized with switch 31 to result in a counting of the oscillator circuit output by counter 32 in the reverse direction until the finish of the count up a fourth pulse being received by apparatus 29.

Figure 5:
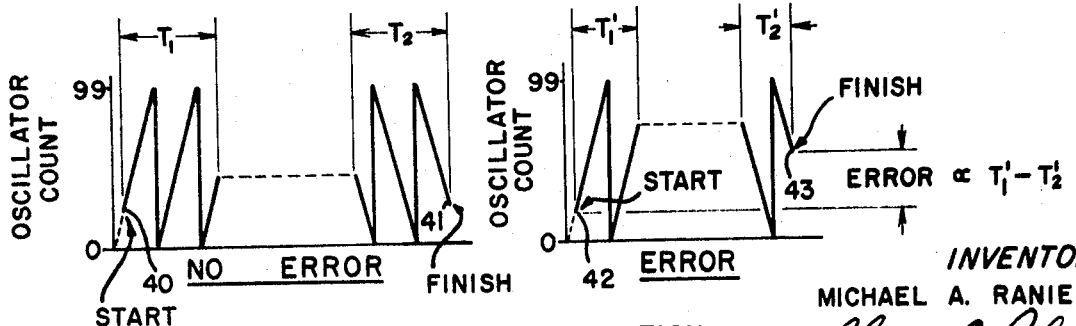
FIG. 5 is a graphical representation of the operation of the counting mechanism shown in FIG. 4.

Referring to the schematic diagram shown on the left in FIG. 5, the oscillator count is shown as 0 to 99 in the vertical scale. When counter 32 reaches 99, the counter is reset to 0 to continue an up count as long as the first period ($T_1$) continues. At the termination of the first period, counter 32 remains at the same count. Upon the second period ($T_2$) commencing, reversing circuit 33 causes the counter to count down and be reset from 0 to 99 until at the end of the second period, a finish count is provided By means of an error detector or responsive means 34, the total count, that is, start count 40 and finish count 41 are compared, and when a deviation beyond some predetermined value, such as 2 is measured, the process or unit is informed of the deviation between the first and second periods $T_1$ and $T_2$, respectively, of the transducer.

A similar showing of a count is shown on the right in FIG. 5 wherein the two periods of FIG. 3 are not the same and a substantial error is detected between start count 42 and finish count 43.

OPERATION OF THE INVENTION

Assuming that the various remote stations of the transmission system shown in FIG. 1 were reporting the condition or temperature of responsive elements 23. By means of the coded message transmission over channel 11, the reporting word such as shown in FIG. 2 is received by console 13 from station No. 1 followed by the period output of the transducer 23 having a series of 4 pulses with periods between the pulses being indicative of the resistance of element 23. The processor unit 14 directs the period output to the readout and error checking apparatus 15 to measure the length of the period between the first set of two pulses and the last set of two pulses and to compare the periods $T_1$ and $T_2$.

When the first pulse triggered gate or switch 31, counter 32 begins to count the output pulses of oscillator circuit 30 in a manner as schematically shown in FIG. 5 until the gate 31 is opened upon apparatus 29 receiving the second pulse. At the beginning of the second measured period ($T_2$) upon apparatus 29 receiving the third pulse, reversing circuit 33 and gate 31 are energized to reverse counter 32 and begin the count of the oscillator circuit output in a reverse direction as schematically shown in FIG. 4 until the fourth pulse is received to open switch 31 and finish the count. Since periods $T_1$ and $T_2$ are the same, the up count and the down count is the same so that start count 40 and finish count 41, as shown in FIG. 5, are the same to indicate that periods $T_1$ and $T_2$ were equal.

A similar reporting word is received from station No. 2 as shown in FIG. 3 with a following pulsating output from transducer 22'. Apparatus 15, as shown in FIG. 4, again measures the two periods between the first set of pulses and the last set of pulses of FIG. 3 and schematically shown on the right in FIG. 5; however, as period $T_1'$ and period $T_2'$ are not the same, start count 42 and finish count 43 of counter 32 have a deviation which, if beyond some predetermined value, is detected by error detector 34 to indicate to processor unit 14 that an error in either the output of transducer 22 or the transmission of the output of transducer 22' exists.

By presetting the counter 32 to some predetermined initial start counts 40 and 42, more than 0 as shown schematically in FIG. 5, the difference between the start and finish count is a positive difference to assist in error detection by detector 34.

The embodiments of the invention in which an exclusive property or right is claimed and defined as follows:

1. A system for checking information at a central station from one of a plurality of remote stations connected to the central station over a transmission channel wherein the information is reported to the central station by a series of energy pulses and the period between adjacent pulses is indicative of the information to be obtained comprising:

counting means associated with the central station for counting electrical pulses from a source including means to energize said counting means during the length of a first period between a first set of two adjacent energy pulses to count said electrical pulses in a first counting direction from a start count and including means to energize said counting means during the length of second period between a second set of two adjacent energy pulses to count said electrical pulses in an opposite counting direction to a finish count, and comparison means connected to said counting means and responsive to said finish count to determine the presence of a difference in the length of said first and second periods.

2. The invention of claim 1 wherein said counting means comprises:

oscillator circuit means for providing said source of electrical pulses at a predetermined frequency,
    counter means for counting said electrical pulses,
    switch means for connecting said oscillator circuit means to said counter means,
    reversing means for reversing the operation of said counter means,
    pulse-responsive means in said central station connected to said switch means and said reversing means whereby upon receiving a first energy pulse said switch means is closed to energize said counter means to start a count of said electrical pulses, upon receiving a second energy pulse said switch means is opened to terminate said count of electrical pulses, upon receiving a third energy pulse said switch means is closed and said reversing means is actuated to reverse said counter to start reverse count of electrical pulses, and upon receiving a fourth energy pulse said switch means is opened to deenergize said counter means to terminate said reverse count of electrical pulses,
    said comparison means being connected to said counter means to be responsive to the difference between said count and said reverse count,
    and last means connected to said comparison means to respond to a predetermined difference in said counts.

3. The invention of claim 1 comprising
    error detection means connected to said comparison means to respond to a predetermined difference in a start count and said finish count and thus a predetermined difference in the length of said first period and said second period.

4. In the invention of claim 1 wherein
    said source comprises a constant-frequency electrical pulse source, and said counting means counts an output of said constant-frequency electrical pulse source and
    switch means responsive to energy pulses for energizing said count means to respond to said electrical pulses in one direction during the time of said first period and energizing said counting means to respond to said electrical pulses in the opposite direction during said second period.

* * * * *